US010479463B1

(12) United States Patent
Orsini (10) Patent No.: US 10,479,463 B1
(45) Date of Patent: Nov. 19, 2019

(54) PERSONAL FLOTATION DEVICE WITH INFLATABLE LIGHT REFLECTIVE BALLOON

(71) Applicant: Jean-Francois Orsini, Washington, DC (US)

(72) Inventor: Jean-Francois Orsini, Washington, DC (US)

( * ) Notice: Subject to any disclaimer, the term of this patent is extended or adjusted under 35 U.S.C. 154(b) by 0 days.

(21) Appl. No.: 16/432,339

(22) Filed: Jun. 5, 2019

(51) Int. Cl.
*B63C 9/125* (2006.01)
*B63C 9/08* (2006.01)
*B64B 1/40* (2006.01)

(52) U.S. Cl.
CPC .............. *B63C 9/1255* (2013.01); *B63C 9/08* (2013.01); *B64B 1/40* (2013.01)

(58) Field of Classification Search
CPC .. B63C 9/00; B63C 9/08; B63C 9/081; B63C 9/125
USPC .................. 441/80, 88, 89, 96, 106
See application file for complete search history.

(56) References Cited

U.S. PATENT DOCUMENTS

| | | | |
|---|---|---|---|
| 4,752,264 A * | 6/1988 | Melendez | B63C 9/20 441/89 |
| 6,203,390 B1 * | 3/2001 | Elliott | B63C 9/20 441/89 |
| 6,368,174 B1 * | 4/2002 | Magee | B63C 9/20 441/89 |
| 9,277,739 B1 | 3/2016 | Barnett | |

FOREIGN PATENT DOCUMENTS

WO    1979000569 A1    8/1979

OTHER PUBLICATIONS https://www.amazon.com/Cartridge-Inflatable-Lifejacket-Lifesaving-Replacement/dp/B01H52EV4G.
https://www.grainger.com/search?searchBar=true&searchQuery=automatic+inflatable+life+vests.
https://www.amazon.com/QYU-Exercise-Inflatable-Commercial-Decoration/dp/B07BVGF2VR/ref=sr_1_2?keywords=inflatable+mirror+ball&qid=1559624887&s=gateway&sr=8-2.

* cited by examiner

*Primary Examiner* — Lars A Olson
(74) *Attorney, Agent, or Firm* — Chen-Chi Lin (57) ABSTRACT

A personal flotation device having a vest, an inflatable balloon, a gas cartridge, a tube, and a harness assembly. The vest comprises a first prong, a second prong opposite the first prong; and a connection member connecting the first prong to the second prong. The connection member comprises a pocket and a flap. The gas cartridge is disposed in the first prong of the vest. The tube connects the inflatable balloon to the gas cartridge. An end of the tube is directly attached to the inflatable balloon. The inflatable balloon is characterized by a deflated condition, stored in the pocket, and an inflated condition.

15 Claims, 6 Drawing Sheets

PERSONAL FLOTATION DEVICE WITH INFLATABLE LIGHT REFLECTIVE BALLOON

CROSS-REFERENCE TO RELATED APPLICATIONS

The disclosure made in the U.S. Pat. No. 9,277,739 to Barnett and the disclosure made in the WO1979000569A1 to Schuster are hereby incorporated by reference.

FIELD OF THE INVENTION

This invention relates generally to a personal flotation device. More particularly, the present invention relates to a personal flotation device with an inflatable light reflective balloon.

BACKGROUND OF THE INVENTION

A victim floating in a river or in ocean is usually difficult to be found. The present disclosure increases the opportunity for the victim to be located.

In the present disclosure, the reflective balloon increases the buoyant force from the water. The reflective balloon make it easier for a rescuer on a helicopter, a fixed-wing airplane, or a boat to locate the user of the personal flotation device. The reflective balloon may further contain a handle shape allowing a rescuer to hold on.

SUMMARY OF THE INVENTION

The present invention discloses a personal flotation device having a vest, an inflatable balloon, a gas cartridge, a tube, and a harness assembly. The vest comprises a first prong, a second prong opposite the first prong; and a connection member connecting the first prong to the second prong. The connection member comprises a pocket and a flap. The gas cartridge is disposed in the first prong of the vest. The tube connects the inflatable balloon to the gas cartridge. An end of the tube is directly attached to the inflatable balloon.

The inflatable balloon is characterized by a deflated condition, stored in the pocket, and an inflated condition. In the deflated condition, the inflatable balloon is deflated; the inflatable balloon is disposed in the pocket; and the flap covers an opening of the pocket. In the inflated condition, the inflatable balloon is inflated by the gas cartridge; a majority portion of the inflatable balloon is out of the pocket; and the flap is pushed aside by the inflated balloon.

DETAILED DESCRIPTION OF THE INVENTION

Figure 1:
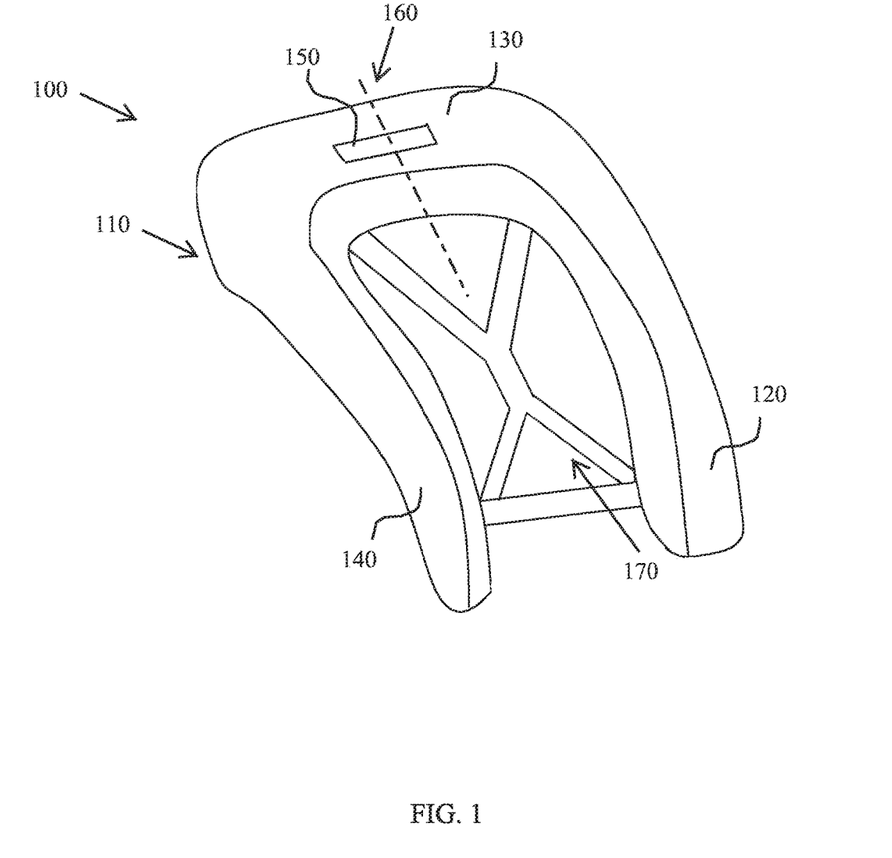
FIG. 1 is a perspective view of a personal flotation device with a deflated balloon in examples of the present disclosure.
Figure 2:
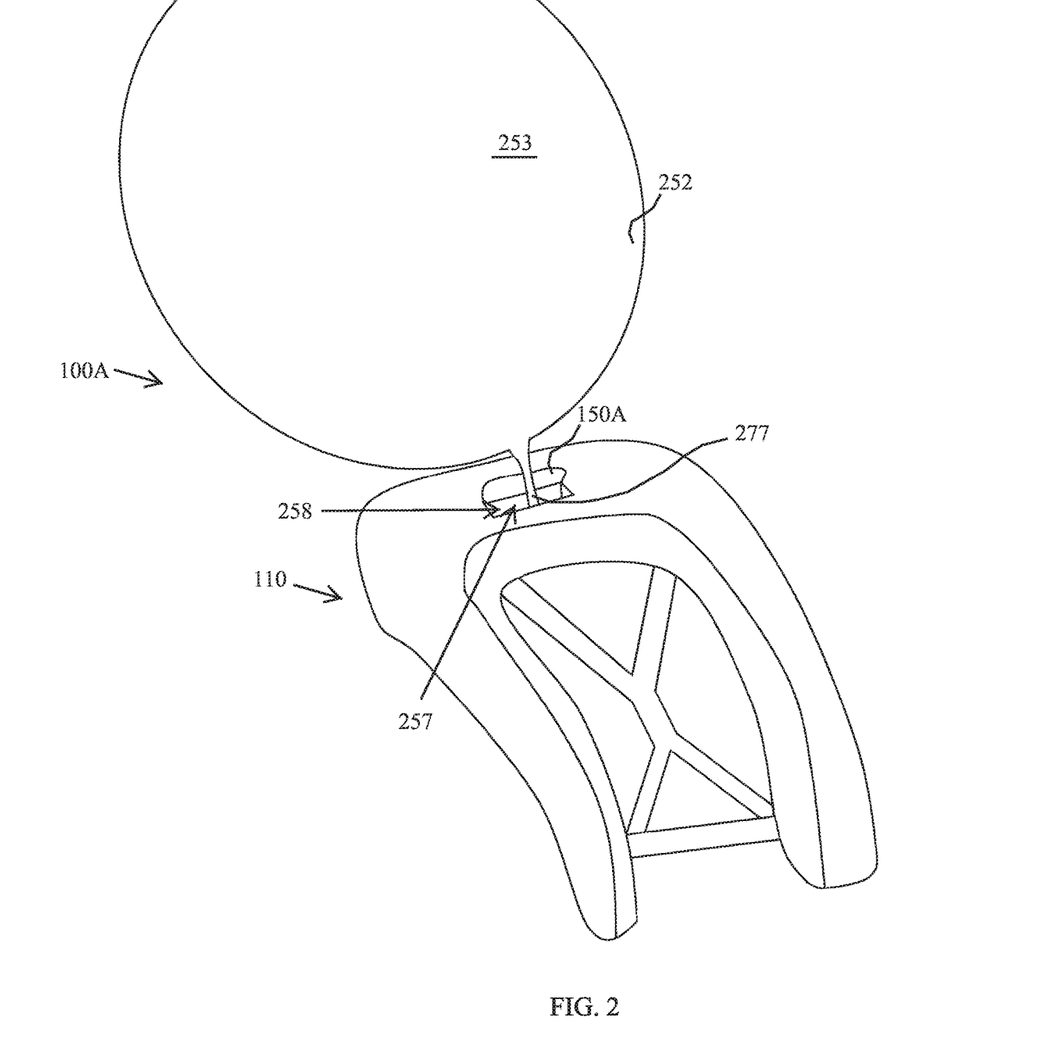
FIG. 2 is a perspective view of the personal flotation device of FIG. 1 whiling the balloon being inflated in examples of the present disclosure.
Figure 6:
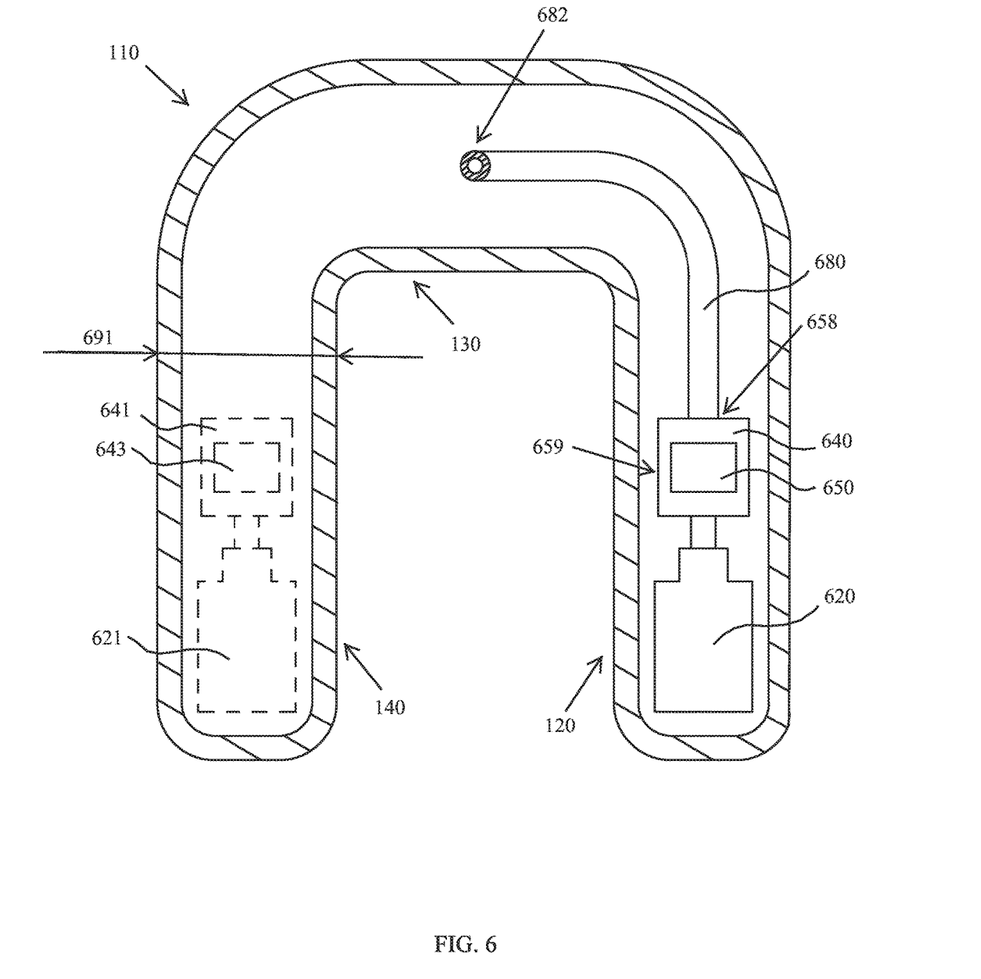
FIG. 6 is a cross sectional view of a vest in examples of the present disclosure.

FIG. 1 is a perspective view of a personal flotation device 100 with a deflated balloon under a flap 150 in examples of the present disclosure. FIG. 2 is a perspective view of the personal flotation device 100A whiling the balloon 252 being inflated in examples of the present disclosure. FIG. 6 is a cross sectional view, cutting along a plane perpendicular to the plane 160, of a vest in examples of the present disclosure. The personal flotation device 100 with a deflated balloon of FIGS. 1 and 100A with an inflated balloon 252 of FIG. 2 comprises a vest 110, an inflatable balloon 252, a gas cartridge 620 of FIG. 6, a tube 680 of FIG. 6, and a harness assembly 170 attached to the vest 110. The vest 110 comprises a first prong 120, a second prong 140 opposite the first prong; and a connection member 130 connecting the first prong 120 to the second prong 140. The connection member 130 comprises a pocket 258 and a flap 150. The gas cartridge 620 is disposed in the first prong 120 of the vest 110. The tube 680 connects the inflatable balloon 252 to the gas cartridge 620. In examples of the present disclosure, an end 682 of the tube 680 is directly attached to the inflatable balloon 252.

The inflatable balloon 252 is characterized by a deflated condition, stored in the pocket 258, of FIG. 2 and an inflated condition of FIG. 2. In the deflated condition, the inflatable balloon 252 is deflated; the inflatable balloon 252 is disposed in the pocket 258; and the flap 150 covers an opening 257 of the pocket 258. In the inflated condition, the inflatable balloon 252 is inflated by the gas cartridge 620; a majority portion of the inflatable balloon 252 is out of the pocket 258; and the flap 150A is pushed aside by the inflated balloon 252.

In FIG. 6, in examples of the present disclosure, the gas cartridge 620 contained pressurized carbon dioxide. In one example, the inflated balloon is of an ovoid shape (inflatable balloon 252 of FIG. 2). In another example, the inflated balloon is of a sphere shape (a special case of an ovoid shape). In one example, a diameter of the sphere shape of the inflated balloon is sixty centimeters. The volume of the balloon is 113,040 cubic centimeters. It requires a gas cartridge 620 contained pressurized carbon dioxide in a liquid form of 150 to 250 cubic centimeters.

In examples of the present disclosure, the inflatable balloon 252 is light, less than five ounces. In examples of the present disclosure, a volume of the inflated balloon 252 is larger than a volume of the vest 110. In examples of the present disclosure, the vest 110 is made of nylon.

In examples of the present disclosure, the gas cartridge 620 contained pressurized helium. In one example, the inflated balloon is of an ovoid shape (inflatable balloon 252 of FIG. 2). In another example, the inflated balloon is of a sphere shape (a special case of an ovoid shape). In one example, a diameter of the sphere shape of the inflated balloon is sixty centimeters. The volume of the balloon is 113,040 cubic centimeters. It requires a gas cartridge 620 contained pressurized helium in a liquid form of 1,700 to 1,800 cubic centimeters.

MUSTANG SURVIVAL Inflatable Life Jacket indicates that the Jacket automatically inflates when submerged in four or more inches of water.

In examples of the present disclosure, the gas cartridge 620 comprises an actuator 640 comprising a pressure sensor 650 and a hydrostatic valve 658 at the interface of the tube 680 and the actuator 640. The actuator 640 is actuated when the gas cartridge 620 is submerged under water and water pressure is larger than a threshold value. Then, the actuated actuator 640 triggers the gas cartridge 620 to fill the inflatable balloon 252. In one example, the hydrostatic valve 658 opens when the pressure value measured by the pressure sensor 650 exceeds the threshold value. In one example, the threshold value is in a range from 14.8 psi to 15.0 psi. In examples of the present disclosure, a length of the gas cartridge 620 is in a range from 3.8 to 4.2 inches. A length of the actuator 640 is in a range from 1.8 to 2.2 inches.

In another example, the actuator 640 contains a dissolvable tablet. The dissolvable tablet dissolves while submerging in water in less than a predetermined time period. In examples of the present disclosure, the predetermined time period is ten seconds.

A water density in a river is less than a water density in ocean. In one example, the actuated actuator 640 actuated by the pressure sensor 650 at a first depth in a river is larger than a second depth in ocean.

In one example, the vest 110 is non-inflatable. In another example, the vest 110 is inflatable. A width 691 of the second prong 140 of an inflatable vest is narrower than a width of the second prong of a non-inflatable vest. In examples of the present disclosure, the width 691 of the second prong 140 of an inflatable vest is in a range from 8 centimeters to 16 centimeters. The width of the second prong of a non-inflatable vest is in a range from 17 centimeters to 24 centimeters.

In examples of the present disclosure, the vest 110 is an inflatable vest. The vest 110 is characterized by a deflated condition and an inflated condition. In the deflated condition, the first prong 120, the connection member 130, and the second prong 140 are deflated. In the inflated condition, the first prong 120, the connection member 130, and the second prong 140 are inflated by the gas cartridge 620 through an openable side hole 659 of actuator 640 controlled by the pressure sensor 650.

In examples of the present disclosure, in FIG. 6, an optional gas cartridge (shown in dashed lines) disposed in the second prong 140. The vest 110 is an inflatable vest. The vest 110 is characterized by a deflated condition and an inflated condition. In the deflated condition, the first prong 120, the connection member 130, and the second prong 140 are deflated. In the inflated condition, the first prong 120, the connection member 130, and the second prong 140 are inflated by the gas cartridge 621 through an openable top hole 643 of actuator 641.

In examples of the present disclosure, an outer surface 253 of the inflatable balloon 252 is reflective similar to a mirror. The reflective balloon make it easier for a rescuer on a helicopter, a fixed-wing airplane, or a boat to locate the user of the personal flotation device 100A. The outer surface 253 has a reflectivity larger than 80% under a normal incidence of light having a wavelength in the range from 380 nm to 740 nm. In examples of the present disclosure, a plurality of coating layers are applied to the outer surface 253 of the inflatable balloon 252 so as to achieve the reflectivity. At least one of the plurality of coating layers is magnesium fluoride.

Figure 5:
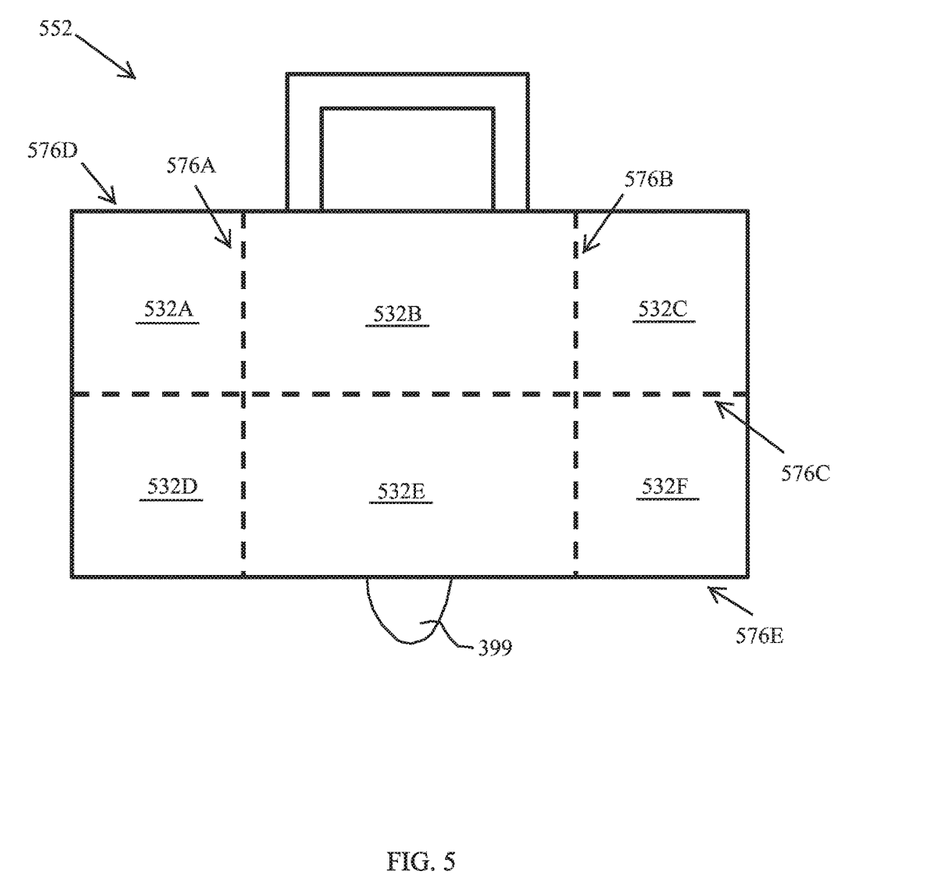
FIG. 5 is a top view of another deflated balloon in examples of the present disclosure.

In examples of the present disclosure, in FIG. 5, a plurality of stretchable reflective tapes 532A, 532B, 532C, 532D, 532E, and 532F are directly attached to the outer surface of the inflatable balloon so as to achieve the reflectivity. Although six stretchable reflective tapes are shown in FIG. 5, the number of the plurality of stretchable reflective tapes may vary.

In examples of the present disclosure, the gas cartridge 620 and the gas cartridge 621 are symmetric with respect to a center plane 160 passing through a centroid of the pocket 258. The harness assembly 170 is symmetric with respect to the center plane 160. The vest 110 is symmetric with respect to the center plane 160. The inflatable balloon 252 is symmetric with respect to the center plane 160.

Figure 4:
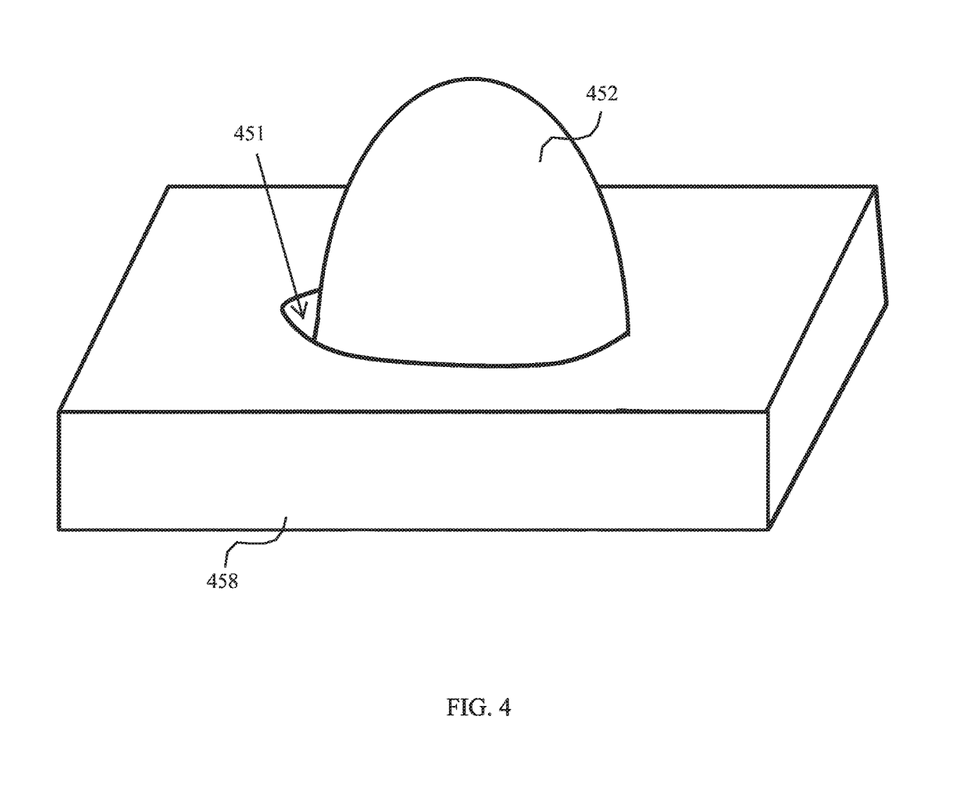
FIG. 4 is a perspective view of a deflated balloon in a recess of a bottom portion of a pocket in examples of the present disclosure.

In examples of the present disclosure, the inflated balloon 252 of FIG. 2 is of an ovoid shape. A bottom floor 458 of FIG. 4 of the pocket 258 of FIG. 2 comprises a hemisphere recess 451 to receive the deflated balloon 452. In one example, the deflated balloon 452 is of a ovoid shape. In one example, the deflated balloon 452 is of a sphere shape.

Figure 3:
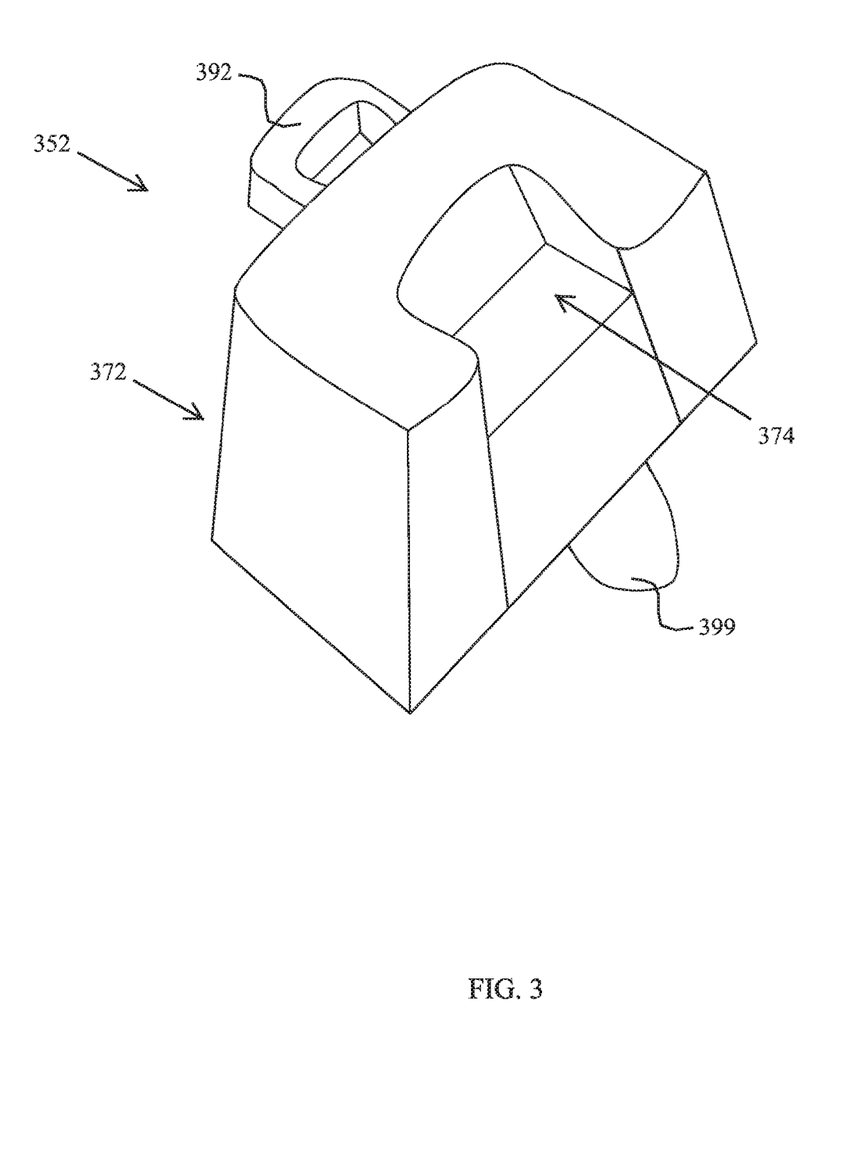
FIG. 3 is a perspective view of another inflated balloon in examples of the present disclosure.

In examples of the present disclosure, in FIG. 3, the inflated balloon 352 is characterized by a rectangular prism shape 372 comprising a recess 374 and a handle shape 392 directly attached to the rectangular prism shape 372. The recess 374 is configured to allow a head of a user of the personal flotation device to rest upon. The handle shape is configured to allow a rescuer to hold on.

In examples of the present disclosure, an end 399 of the inflatable balloon 352 is directly attached to a surface of the pocket 258 of FIG. 2.

In examples of the present disclosure, in FIG. 5, the deflated balloon 552 is foldable along a plurality of folding lines 576A, 576B, 576C, 576D, and 576E so that the deflated balloon is folded into a rectangular prism shape containing a plurality of folded layers. Although five folding lines are shown in FIG. 5, the number of the plurality of folding lines may vary.

In examples of the present disclosure, the balloon material directly attached to the stretchable reflective tape 532E is at least three times less stretchable than the balloon material directly attached to the stretchable reflective tapes 532A, 532B, 532C, 532D, and 532F so as to form the recess 374 in an inflated condition of the balloon. In examples of the present disclosure, the balloon material directly attached to the stretchable reflective tape 532E is at least two times thicker than the balloon material directly attached to the stretchable reflective tapes 532A, 532B, 532C, 532D, and 532F so as to form the recess 374 in an inflated condition of the balloon.

In example of the present disclosure, one end of the balloon 252 includes an inflation valve to facilitate pumping gas into the balloon and keeping the gas in the balloon with minimal leakage (for example, last for more than seven days). The inflation valve may be similar to a basketball valve or a tire valve.

In examples of the present disclosure, the balloon 252 is a flight type (filled with helium, above water level, and not in contact with water). A tether 277 is between the inflatable balloon 252 and the vest 110. The tether 277 has a length in a range from five feet to fifteen feet. In the deflated condition of the balloon 252, the tether 277 is folded or coiled and is stored in the pocket 258. In the inflated condition of the balloon 252, a majority portion of the tether 277 is out of the pocket 258. The balloon 352 is a float type (bottom portion of the balloon 352 contacts water). In examples of the present disclosure, the tether 277 includes a prolongation portion of the tube 680.

In examples of the present disclosure, a same personal flotation device comprises a first balloon (balloon 252 of a flight type) and a second balloon (balloon 352 of a float type), a gas cartridge 620 and a gas cartridge 621. The gas cartridge 620, containing pressurized helium, is configured to inflate the balloon 252 through the tube 680. The gas cartridge 621, containing pressurized carbon oxide, is configured to inflate the balloon 352 through another tube (not shown in FIG. 6) similar to the tube 680. In the deflated condition, the balloon 252 and the balloon 352 are stored in the pocket 258. In the inflated condition, a majority portion of the balloon 252 and a majority portion of the balloon 352 are out of the pocket 258.

Those of ordinary skill in the art may recognize that modifications of the embodiments disclosed herein are possible. For example, a shape of the inflatable balloon may vary. Other modifications may occur to those of ordinary skill in this art, and all such modifications are deemed to fall within the purview of the present invention, as defined by the claims.

The invention claimed is:

1. A personal flotation device comprising:
  a vest comprising:
    a first prong;
    a second prong opposite the first prong; and
    a connection member connecting the first prong to the second prong, the connection member comprising
      a pocket; and
      a flap;
  an inflatable balloon;
  a gas cartridge disposed in the first prong of the vest;
  a tube connecting the inflatable balloon to the gas cartridge;
  an other inflatable balloon;
  an other gas cartridge disposed in the second prong; and
  a harness assembly attached to the vest;
  wherein the inflatable balloon is characterized by
    a deflated condition in which
      the inflatable balloon is deflated;
      the inflatable balloon is disposed in the pocket; and
      the flap covers an opening of the pocket; and
    an inflated condition in which
      the inflatable balloon is inflated by the gas cartridge;
      a majority portion of the inflatable balloon is out of the pocket; and
      the flap is pushed aside by the inflated balloon;
  wherein the other inflatable balloon is characterized by
    a deflated condition in which
      the other inflatable balloon is deflated; and
      the other inflatable balloon is disposed in the pocket; and
    an inflated condition in which
      the other inflatable balloon is inflated by the other gas cartridge; and
      a majority portion of the other inflatable balloon is out of the pocket;
  wherein the gas cartridge contained pressurized helium; and
  wherein the other gas cartridge contained pressurized carbon dioxide.

2. The personal flotation device of claim 1, wherein the gas cartridge comprises an actuator;
  wherein the actuator is actuated when the gas cartridge is submerged under water and water pressure is larger than a threshold value;
  wherein the actuated actuator triggers the gas cartridge to fill the inflatable balloon.

3. The personal flotation device of claim 1, wherein the vest is an inflatable vest and the vest is characterized by
  a deflated condition in which
    the first prong, the connection member, and the second prong are deflated; and
  an inflated condition in which
    the first prong, the connection member, and the second prong are inflated by the gas cartridge.

4. The personal flotation device of claim 1, wherein the vest is an inflatable vest and the vest is characterized by
  a deflated condition in which
    the first prong, the connection member, and the second prong are deflated; and
  an inflated condition in which
    the first prong, the connection member, and the second prong are inflated by the other gas cartridge.

5. The personal flotation device of claim 1, wherein the inflated balloon is of an ovoid shape; and
  wherein a bottom floor of the pocket comprises a hemisphere recess to receive the deflated balloon.

6. The personal flotation device of claim 1, wherein the inflated balloon is characterized by
  a rectangular prism shape comprising a recess; and
  a handle shape directly attached to the rectangular prism shape;
  wherein the recess is configured to allow a head of a user of the personal flotation device to rest upon; and
  wherein the handle shape is configured to allow a rescuer to hold on.

7. The personal flotation device of claim 1, wherein an end of the inflatable balloon is directly attached to a surface of the pocket.

8. The personal flotation device of claim 1, wherein the deflated balloon is foldable along a plurality of folding lines so that the deflated balloon is folded into a rectangular prism shape containing a plurality of folded layers.

9. The personal flotation device of claim 1, wherein the gas cartridge contained pressurized carbon dioxide.

10. The personal flotation device of claim 1, a tether is between the inflatable balloon and the vest.

11. The personal flotation device of claim 10, wherein the gas cartridge contained pressurized helium;
  wherein a length of the tether is in a range from five feet to fifteen feet; and
  wherein the inflatable balloon is characterized by
    the inflated condition in which
      an entirety the inflatable balloon is out of the pocket;
      a majority portion of the tether is out of the pocket and is above water surface; and
      the inflated balloon is above the water surface and is above a top end of the tether so as to facilitate a search and rescue operation.

12. A personal flotation device comprising:
  a vest comprising:
    a first prong;
    a second prong opposite the first prong; and
    a connection member connecting the first prong to the second prong, the connection member comprising
      a pocket; and
      a flap;
  an inflatable balloon;
  a gas cartridge disposed in the first prong of the vest;
  a tube connecting the inflatable balloon to the gas cartridge; and
  a harness assembly attached to the vest;
  wherein the inflatable balloon is characterized by
    a deflated condition in which
      the inflatable balloon is deflated;
      the inflatable balloon is disposed in the pocket; and
      the flap covers an opening of the pocket; and an inflated condition in which
the inflatable balloon is inflated by the gas cartridge;
a majority portion of the inflatable balloon is out of the pocket; and
the flap is pushed aside by the inflated balloon; and
wherein an outer surface of the inflatable balloon is reflective having a reflectivity larger than 80% under a normal incidence of light having a wavelength in a range from 380 nm to 740 nm.

13. The personal flotation device of claim 12, wherein a plurality of stretchable reflective tapes are directly attached to the outer surface of the inflatable balloon so as to achieve the reflectivity.

14. The personal flotation device of claim 12, wherein a plurality of coating layers are applied to the outer surface of the inflatable balloon so as to achieve the reflectivity; and
wherein at least one of the plurality of coating layers is magnesium fluoride.

15. A personal flotation device comprising:
a vest comprising:
a first prong;
a second prong opposite the first prong; and
a connection member connecting the first prong to the second prong, the connection member comprising
a pocket; and
a flap;
an inflatable balloon;
a gas cartridge disposed in the first prong of the vest;
an other gas cartridge disposed in the second prong;
a tube connecting the inflatable balloon to the gas cartridge; and
a harness assembly attached to the vest;
wherein the inflatable balloon is characterized by
a deflated condition in which
the inflatable balloon is deflated;
the inflatable balloon is disposed in the pocket; and
the flap covers an opening of the pocket; and
an inflated condition in which
the inflatable balloon is inflated by the gas cartridge;
a majority portion of the inflatable balloon is out of the pocket; and
the flap is pushed aside by the inflated balloon;
wherein the vest is an inflatable vest and the vest is characterized by
a deflated condition in which
the first prong, the connection member, and the second prong are deflated; and
an inflated condition in which
the first prong, the connection member, and the second prong are inflated by the other gas cartridge;
wherein the gas cartridge and the other gas cartridge are symmetric with respect to a center plane passing through a centroid of the pocket;
wherein the harness assembly is symmetric with respect to the center plane;
wherein the vest is symmetric with respect to the center plane; and
wherein the inflatable balloon is symmetric with respect to the center plane.

* * * * *